United States Patent

[11] 3,580,552

| [72] | Inventor | Dan Sigurd Hansen<br>Copenhagen-Valby, Denmark |
|---|---|---|
| [21] | Appl. No. | 814,774 |
| [22] | Filed | Apr. 9, 1969 |
| [45] | Patented | May 25, 1971 |
| [73] | Assignee | F. L. Smidth & Co.<br>New York, N.Y. |
| [32] | Priority | Apr. 24, 1968 |
| [33] | | Great Britain |
| [31] | | 19,440/68 |

[54] STACK PREHEATER
4 Claims, 6 Drawing Figs.

[52] U.S. Cl............................................................ 263/32,
34/57
[51] Int. Cl......................................................... F27b 7/02,
F26b 17/00
[50] Field of Search........................................... 263/32;
34/57, 57 (E)

[56] References Cited
UNITED STATES PATENTS

| 2,435,927 | 2/1948 | Manning et al. | 34/57X |
| 2,441,613 | 5/1948 | Balassa | 34/57E |
| 2,728,995 | 1/1956 | Schaub | 34/57E |

*Primary Examiner*—John J. Camby
*Attorney*—Pennie, Edmonds, Morton, Taylor and Adams ABSTRACT: A heat exchanger for preheating granular or pulverulent material especially when such material is fed to a rotary kiln. The preheater is in the form of an upright stack or tubular conduit within which means is fixedly mounted extending from the bottom to the top of the stack and providing guiding surfaces for the heating gas which flows upwardly through the stack, and for the granular or pulverulent material as it flows downwardly countercurrent to the gas flow.

Patented May 25, 1971

INVENTOR
DAN S. HANSEN

BY Pennie, Edmonds,
Morton, Taylor & Adams

ATTORNEYS

Patented May 25, 1971

INVENTOR
DAN S. HANSEN

BY Pennie, Edmonds,
Morton, Taylor & Adams

ATTORNEYS

Patented May 25, 1971

3,580,552

3 Sheets-Sheet 3

STACK PREHEATER

BACKGROUND OF THE INVENTION

Preheaters of the stack-type are provided with staggered, built-in guide surfaces, often projecting from the walls of the stack. The material supplied to the stack at its upper end and passing down by gravity slides from one guide surface to the next. The guide surfaces may be inclined or horizontal and serve to retard the passage of the material so as to bring about contact between the material and the hot gas flowing countercurrently up through the stack. Heat exchangers of this kind are used for drying or cooling as well as preheating granular or pulverulent material.

As the material falls down through the stack from one guiding surface to the next it is subjected to a certain intended whirling movement by the flow of the gas which is caused to form eddies by passing between the guide surfaces. Thus a more intimate contact between the material and the gas is provided by which the heat exchange is improved. In the known heat exchangers of this type the formation of eddies is not very effective, and the heat exchangers have to be provided with many stages and therefore become very tall if a reasonable and effective heat exchange is to be obtained.

SUMMARY OF THE INVENTION

The present invention provides a heat exchanger of the aforesaid type, but with improved built-in devices to ensure an effective formation of gas eddies and so that the overall height of the heat exchanger may be reduced, even with improved heat exchange. In the improved heat exchanger a continuous helical guide member extends down through the stack and is arranged with a downwardly facing acute angle to the wall of the stack.

Material fed to the upper end of the stack will move downwards in a helical path tending towards the axis of the stack at a velocity depending, among other things, upon the pitch of the surface of the helical guide and the acute angle formed by such helical surface with the axis, while the air or the gas flows upwards through the stack, continually forming eddies. At the axis of the stack the material desirably passes through an opening in the helical guide and is entrained by an air stream, some of which is passing through the same opening and kept suspended in same for a short period before it is precipitated by the cyclone action of the eddies. While the material is suspended, a very effective heat exchange takes place, and since suspension and precipitation by the built-in device of the invention may be effected at any stage whatever of the stack and in a sequence with very little difference of level, the stack is advantageously utilized so that its height may be reduced as compared to that of similar known structures.

A second helical surface may be provided extending from the radially inner edge of the guide surface approximately horizontally outwards to the stack wall. A portion of the wall is then isolated by the two surfaces from the material fed to the upper end of the stack and from the gas flowing upwards. This portion of the wall therefore serves a purely structural function and can be formed with openings for the sake of economy and lightness or cut away altogether and replaced with structural members such as vertical bars. The portion of the wall isolated from the material and gas may form more than half the wall.

The size of the acute angle between the underside of the guide surface and the stack wall depends in part upon the nature of the material, and in part upon the nature of the process. Where preheating of cement raw material is involved, the angle should be equal to or less than 25° and may vary from the inlet to the outlet of the shaft, the properties of the material being changed during the preheating. As a rule it will therefore be necessary to have a highly inclined helical surface at the lower end of the stack, i.e. a small acute angle and, for example, a greater pitch for the helical surface so as to eliminate caking of the material.

When the apparatus is used as a preheater it is desirable for the helical guide surface to be of decreasing pitch in the direction towards the upper end of the stack so that the velocity of the air or gas may be maintained unaltered or remain independent of the temperature difference between the various stages of the stack.

The helical surface formed so as to provide a central opening extending through the whole stack may be provided with a frustoconical regulating member on the axis of the stack for regulating the size of the central opening. This regulating member is so supported that it may be shifted in the axial direction of the helical surface. By such a regulating member it is possible to a certain extent to regulate the flow of material through the stack over the inner edge of the helical surface and also to regulate the concentration of material at this location and consequently its suspension in the air or gas forced up through the stack. This regulating member may close the control opening through the stack.

Preferably, the built-in helical guide surface is composed of circular helical sections. By selecting such sections with a suitable inner radius the sections may be adapted to the regulating means in such manner that with different innner radii of the individual circular ring sections up through the stack the same annular slot width is obtainable throughout the extent of the helical surface between the surface and the regulating member.

As appears from the foregoing description the heat exchanger may advantageously be utilized as a preheater in a plant for burning cement. The invention also includes such a plant, in which the lower end of the stack is connected to a rotary kiln outlet for exit gas while the upper end of the stack is connected to a cyclone and also has means for introducing pulverulent cement raw material into the stack for preheating, and for subsequent burning in the rotary kiln. The lower end of the stack is formed and connected to the rotary kiln in such manner that the material may slide into the kiln.

In a plant of this kind it is important to obtain an effective heat exchange as is obtainable with the preheater stack of the invention, since the heat of the exit gas leaving the stack is usually lost, and the temperature at this point should therefore be as low as possible.

Two embodiments of stack preheaters constructed in accordance with the invention, and an example of their use in a cement-burning plant, are illustrated in the accompanying drawings, in which:

DESCRIPTION OF THE PREFERRED EMBODIMENTS

Figure 1:
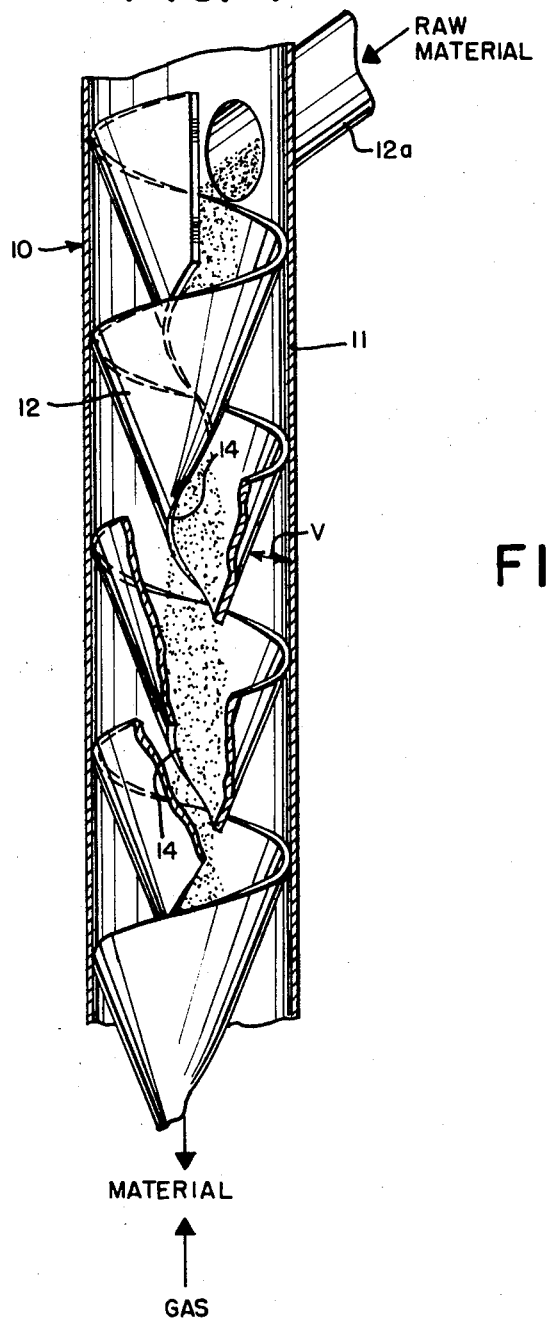
FIG. 1 is a diagrammatic side view of one preheater, the front half of the stack wall being omitted.
Figure 1A:
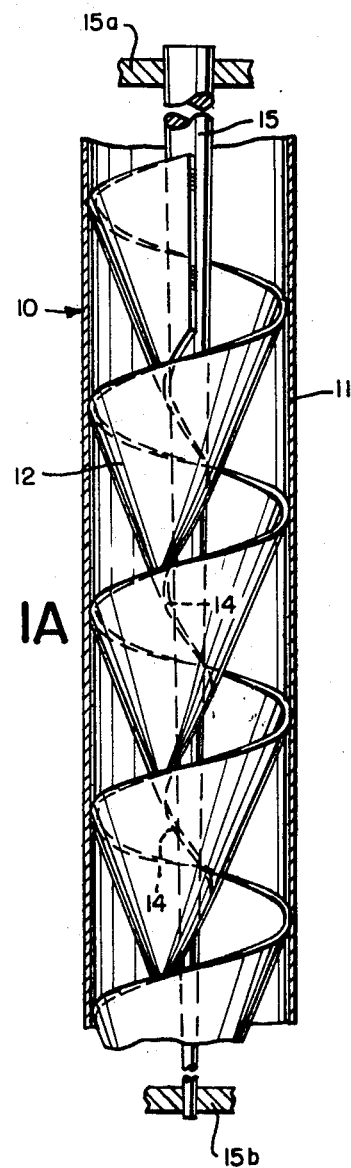
FIG. 1a is the same as FIG. 1, but including a regulating member.
Figure 2:
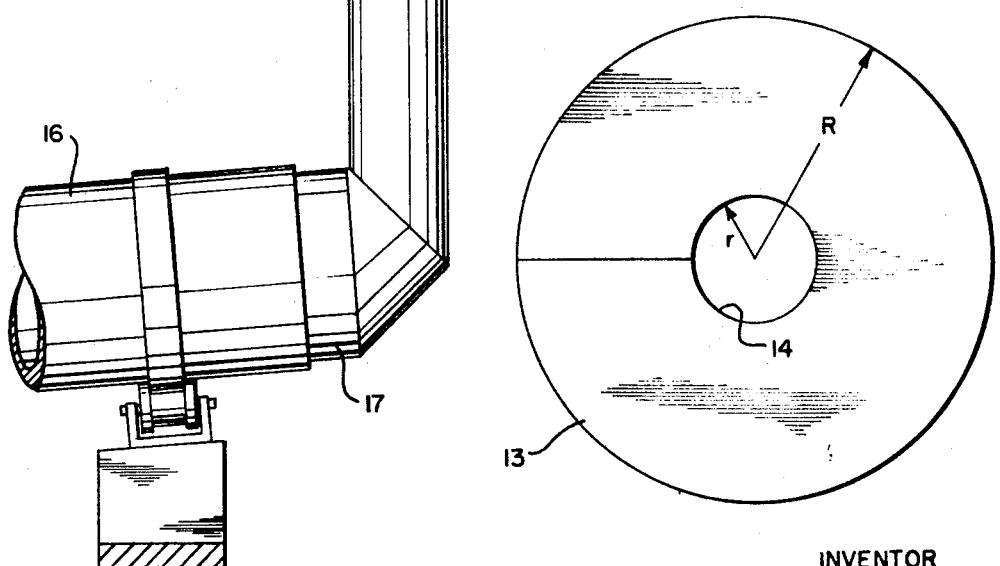
FIG. 2 is a plan view of a circular helical-ring section for the helical surface shown in FIG. 1.

The preheater 10 shown in FIGS. 1 and 1a has a tubular stack 11 with a built-in helical guide 12. One turn of a circular helical-ring section 13 of the helical guide 12 is shown in FIG. 2 the ring having an inner radius $r$ and an outer radius $R$. The inner radius outlines a central opening 14 through the stack. In the vertical plane the lower surface of the helical member 12 faces downwardly at an acute angle $v$ to the stack wall.

In FIG. 1 a conduit 12a is shown for the entrance of the granular material at the top of stack 12, the gas flowing out of the top of the stack 12, the gas flowing out of the top of the stack. The two arrows at the bottom of the stack indicate respectively the outflow of the material and the inflow of gas.

The stack 11 and the helical surface 12 are also indicated in FIG. 1a with a regulating member 15 in the form of a tapered stack which is vertically shiftable in supports 15a and 15b.

Figure 3:
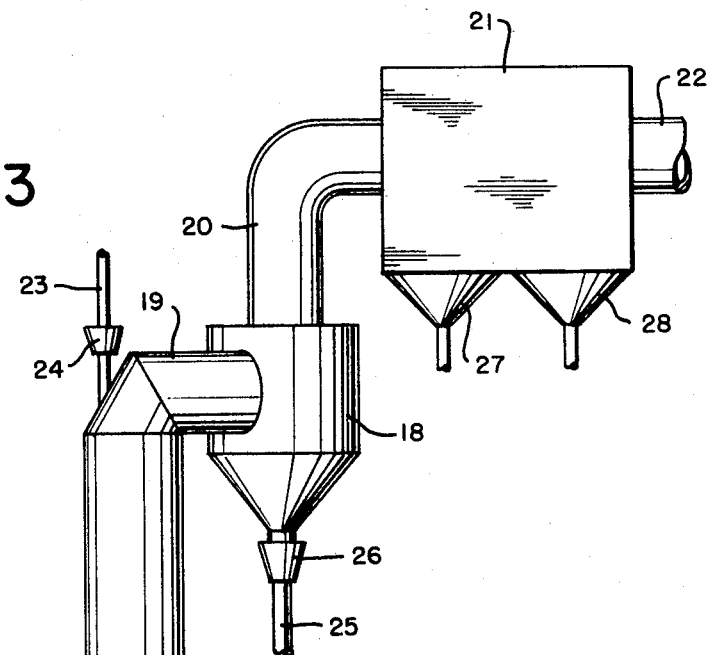
FIG. 3 is a diagrammatic representation of a cement-burning plant.

The plant shown in FIG. 3 consists of a rotary kiln 16, the drawing showing only its outlet end for the exit gases, an exit gas chamber 17 and a stack 11 leading to a cyclone 18 through a connecting conduit 19 and discharge conduit 20 for the gases. Furthermore, the plant comprises a filter 21 with discharge 22 to a chimney via an exit gas fan (not shown). The stack 11 has a feed pipe 23 with an airtight gate valve 24 for feeding cement raw material to the stack. The cyclone 18 has a discharge pipe 25 with an airtight gate valve 26 for conveying away the material separated by cyclone 18. If desired, this material may be returned to the pipe 23 or be passed direct to the kiln or utilized in some other manner. The dust separated by filter 21 is collected in two outlet hoppers 27 and 28 from which it is carried away, for example together with the material separated by cyclone 18.

Material fed to the upper end of the stack 11 will move down through the stack by gravity countercurrently to the hot gases introduced at the lower end of the stack. The movement of material down through the stack is guided by the built-in helical guide which is shown in the drawing as a continuous helical or screw-threaded member, but it may also be constituted of built-in sections. When a suitable angle of pitch is selected for the helical surface and a suitable acute angle $v$ between the helical surface and the stack wall, the result obtained will be that the particles of material perform a combined helical and spiral movement down the helical surface towards the central part of the stack where the material overflows the inner edge 14 of the helical surface (FIG. 1). The particles of material are here intercepted by the upward current of gas whereby a heat exchange takes place, and owing to the eddies formed by the gas the particles are again separated by cyclone action on the helical surface at the stack wall, after which the process is repeated. As a result of the concentrated construction of the guide surface the process may be repeated several times while material is passing through the stack by which very effective heat exchange is obtained even if the stack is short.

Positive control of the flow of material through the stack at its central opening is obtainable by retarding the overflow of the material over the inner edge 14 of the helical guide 12 by means of the tapered or frustoconical stack 15 shown in FIG. 1a. To regulate the width of the continuous gap formed between the inner edge 14 of the helical surface 12 and stack 15, the stack may be vertically shifted in the supports 15a and 15b.

In the plant shown in FIG. 3 the material which has reached the bottom of the stack 11 passes directly into the rotary kiln 16 through the same chamber 17 that leads the exit gases from the burning process in the kiln into the stack. The exit gases leave the stack through the conduit 19 and are dedusted in the cyclone 18 and the filter 21. Apart from the stack 11, the plant illustrated in FIG. 3 is of conventional design and thus known per se, but a stack according to the invention is of particular advantage in a plant of this type, and the plant is novel and advantageous in this respect.

Figures 4, 5:
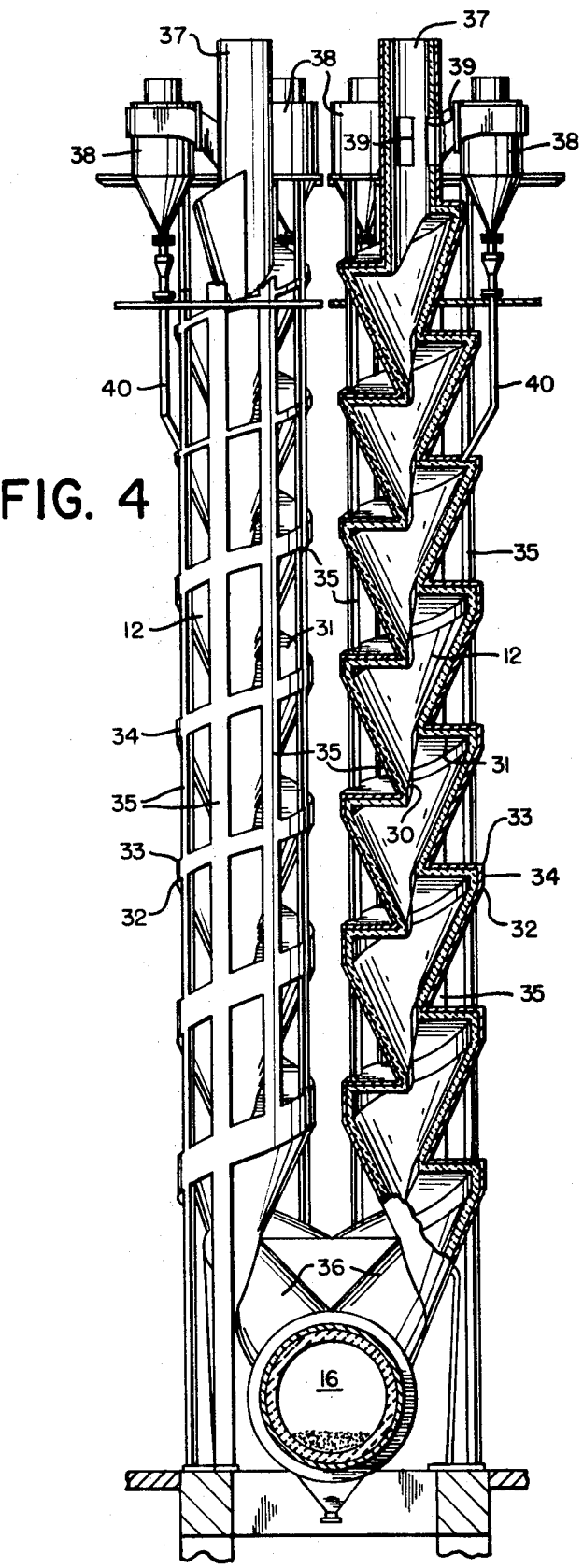
FIG. 4 is a front elevation, with parts in section, of the second embodiment.
FIG. 5 is a side elevation of the preheater of FIG. 4.

The preheater shown in FIGS. 4 and 5 has a helical guide surface 12 similar to that in the FIG. 1 embodiment. Extending outwards from the radially inner edge 30 of the guide surface 12 is a second helical surface 31. The radially outer edge 32 of the helical guide surface 12 is connected to the radially outer edge 33 of the helical surface 31 by a portion 34 of a stack wall. Because of the arrangement of the helical surfaces 12 and 31, only the portion 34 of the stack wall is in contact with the gas and material inside the preheater. The remainder of the stack wall can therefore be removed and replaced by a number of vertical structural bars 35.

The cement-burning plant of FIGS. 4 and 5 incorporates two preheaters mounted side-by-side and feeding the same rotary kiln 16 through a pair of suitably shaped ducts 36 through which the gases pass into the preheaters. At the top of each preheater is a central pipe 37, through which the material to be heated is introduced, and three cyclone separators 38 through which the upward flowing gas passes after leaving the preheater through three openings 39 in the pipe 37. Dust separated from the gas in the cyclones 38 is reintroduced into the preheaters through pipes 40. The behavior of the material and the upward flowing gases in the preheater is the same as that described with reference to the FIG. 1 embodiment.

I claim:

1. A heat exchanger for granular or pulverulent material comprising an upright stack, means for feeding the material into its upper end, means for supplying gas to the lower end of the stack to flow countercurrently to the material descending through the stack, and helical guide means extending throughout the stack having its lower surface disposed at an acute angle to the wall of the stack, said guide means being shaped so as to provide a central opening extending down through the stack and in which a frustoconical regulating member is disposed axially of the stack and is shiftable in the axial direction for regulating the central openings through the helical surface.

2. A heat exchanger for granular or pulverulent material comprising an upright stack, means for feeding the material into its upper end, means for supplying gas to the lower end of the stack to flow countercurrently to the material descending through the stack, a helical guide means extending throughout the stack having its lower surface disposed at an acute angle to the wall of the stack, and a second helical guide means extending from the radially inner edge of said guide means substantially horizontally outwards to the stack wall whereby a portion of the wall is isolated by the two guides from the material fed to the upper end of the stack and from the gas flowing upwards through the stack.

3. A heat exchanger according to claim 2, in which the portion of the stack wall isolated by said two guides is cut away and replaced with spaced supporting members.

4. A heat exchanger for granular or pulverulent material comprising an upright stack which is connected at its lower end to a slightly inclined rotary kiln and connected at its upper end to a cyclone, the gas from the kiln flowing into the lower end of the stack, means for supplying granular or pulverulent material to be burned into the upper end of the stack for preheating therein, helical guide means extending throughout the stack having their lower surfaces disposed at an acute angle to the wall of the stack, and means for conveying said preheated material from the lower end of the stack into the kiln for burning therein.